United States Patent
Hamilton et al.

(10) Patent No.: US 6,330,029 B1
(45) Date of Patent: Dec. 11, 2001

(54) PARTICULAR PATTERN OF PIXELS FOR A COLOR FILTER ARRAY WHICH IS USED TO DERIVE LUMINANCE AND CHROMINANCE VALUES

(75) Inventors: John F. Hamilton; James E. Adams; David M. Orlicki, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/042,814

(22) Filed: Mar. 17, 1998

(51) Int. Cl.$^7$ ........................................... H04N 3/14
(52) U.S. Cl. ........................... 348/272; 348/273
(58) Field of Search ....................... 348/271, 272, 348/278, 279, 266, 273; 358/512, 513, 514; 345/32, 22; 257/440

(56) References Cited

U.S. PATENT DOCUMENTS

| | | |
|---|---|---|
| 3,971,065 | 7/1976 | Bayer . |
| 4,630,106 * | 12/1986 | Morimura et al. ................ 348/274 |
| 4,768,084 * | 8/1988 | Noda et al. ........................ 348/279 |
| 5,028,547 * | 7/1991 | Iizuka et al. ...................... 348/273 |
| 5,418,564 * | 5/1995 | Aoki et al. ........................ 348/279 |
| 5,419,990 | 5/1995 | Wake et al. . |
| 5,596,367 | 1/1997 | Hamilton, Jr. et al. . |
| 5,631,703 * | 5/1997 | Hamilton, Jr. et al. ............ 348/273 |
| 5,786,588 * | 7/1998 | Takahashi ......................... 348/273 |
| 5,880,781 * | 3/1999 | Udagawa et al. .................. 348/279 |
| 5,966,174 * | 10/1999 | Yamamoto et al. ............... 348/273 |

* cited by examiner

Primary Examiner—Wendy R. Garber
Assistant Examiner—Rashawn N. Tillery
(74) Attorney, Agent, or Firm—Raymond L. Owens

(57) ABSTRACT

A color filter array for an image sensor which has a plurality of pixels is disclosed. The color filter array includes a plurality of color pixel kernels, with each kernel having the plurality of pixels arranged in the following pattern

| A | C |
|---|---|
| D | B | wherein:
A and B are companion colors; and
C and D are companion colors.

3 Claims, 1 Drawing Sheet

| M$_{11}$ | C$_{12}$ | M$_{13}$ | C$_{14}$ | M$_{15}$ |
|---|---|---|---|---|
| Y$_{21}$ | G$_{22}$ | Y$_{23}$ | G$_{24}$ | Y$_{25}$ |
| M$_{31}$ | C$_{32}$ | M$_{33}$ | C$_{34}$ | M$_{35}$ |
| Y$_{41}$ | G$_{42}$ | Y$_{43}$ | G$_{44}$ | Y$_{45}$ |
| M$_{51}$ | C$_{52}$ | M$_{53}$ | C$_{54}$ | M$_{55}$ |

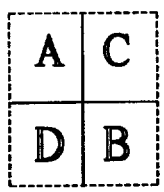
FIG. 1
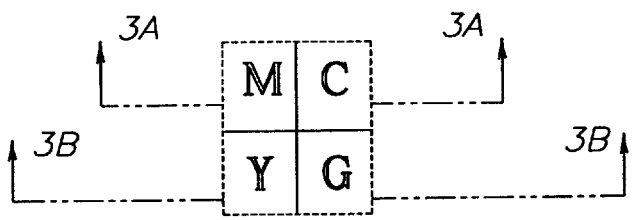
FIG. 2
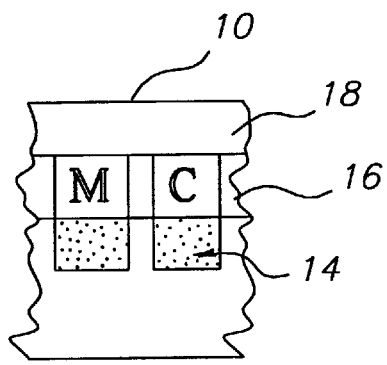
FIG. 3A
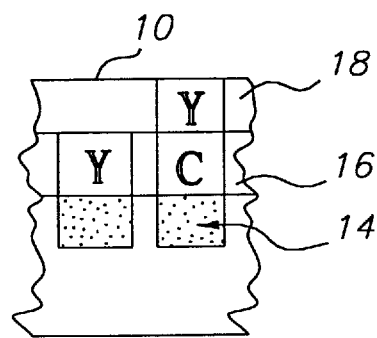
FIG. 3B
| M₁₁ | C₁₂ | M₁₃ | C₁₄ | M₁₅ |
| Y₂₁ | G₂₂ | Y₂₃ | G₂₄ | Y₂₅ |
| M₃₁ | C₃₂ | M₃₃ | C₃₄ | M₃₅ |
| Y₄₁ | G₄₂ | Y₄₃ | G₄₄ | Y₄₅ |
| M₅₁ | C₅₂ | M₅₃ | C₅₄ | M₅₅ |
FIG. 4
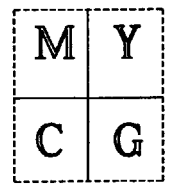
FIG. 5

PARTICULAR PATTERN OF PIXELS FOR A COLOR FILTER ARRAY WHICH IS USED TO DERIVE LUMINANCE AND CHROMINANCE VALUES

FIELD OF THE INVENTION

The present invention relates to color filter arrays for image sensors.

BACKGROUND OF THE INVENTION

In electronic color imaging, it is desirable to simultaneously capture image data in three color planes, usually red, green and blue. When the three color planes are combined, it is possible to create high-quality color images. Capturing these three sets of image data can be done in a number of ways. In electronic photography, this is sometimes accomplished by using a single two dimensional array of sensors that are covered by a pattern of red, green and blue filters. This type of sensor is known as a color filter array or CFA. Below is shown the red (R), green (G) and blue (B) pixels as are commonly arranged on a CFA sensor.

When a color image is captured using a CFA, it is necessary to interpolate the red, green and blue values so that there is an estimate of all three color values for each sensor location. Once the interpolation is done, each picture element, or pixel, has three color values and can be processed by a variety of known image processing techniques depending on the needs of the system. Some examples of the reasons for processing are to do image sharpening, color correction or half toning.

The diagram below shows how red green and blue pixels can be arranged in a particular color filter array pattern, hereinafter referred to as the Bayer color filter array. For a more detailed description see U.S. Pat. No. 3,971,065 issued Jul. 20, 1976 to Bayer.

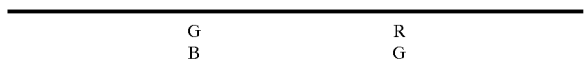

In commonly assigned U.S. Pat. No. 5,596,367 issued Jan. 21, 1997, incorporated by reference, adaptive methods of calculating green pixel values at pixels where green is not directly measured is described. These methods rely on algorithmically selecting one or two ways to calculate the missing green values. After determining the missing green values, the red minus green color difference values are computed at red pixel sites and the blue minus green color difference values are computed at blue pixel sites. The missing values for each color difference are computed by simple linear interpolation. Because the red, green, and blue CFA filters absorb two thirds of the incident light, such CFA sensors tend to be photometrically slow. Especially in low light situations, it would be better to use subtractive CFA filters such as cyan, magenta, yellow, and green. It would also be desirable to have a CFA pattern that permits adaptive interpolation of the luminance value (analogous to green) and permits for adaptive interpolation of both color difference values as well.

SUMMARY OF THE INVENTION

It is an object of the present invention is to provide a color filter array pattern which provides signals which can be efficiently processed since the color filter array uses a 2×2 repeating pattern.

It is a further object of the invention to have a CFA pattern which has at least two methods of luminance interpolation as well as two methods for each chrominance value to thereby provide improved interpolation for both luminance and chrominance.

This object is achieved in a color filter array for an image sensor which has a plurality of pixels, the color filter array comprising:

(a) a plurality of color pixel kernels, with each kernel having the plurality of pixels arranged in the following pattern

wherein:
A and B are companion colors; and
C and D are companion colors.

ADVANTAGES

An advantage of the present invention is that the color filter array pattern uses kernels with only four pixels and this facilitates calculations and interpolation.

A feature of this invention is that it permits non-linear interpolation of both luminance values and chrominance values, regardless of location within the CFA pattern.

Another advantage of the present invention is that the same processing can be used irrespective of the location of the pixels in the CFA.

Another advantage of the present invention is that it facilitates the use of the smallest kernel of CFA pixels can be used to provide a high quality estimate of luminance.

BRIEF DESCRIPTION OF THE DRAWINGS

FIG. 1 is a plan view of a generalized kernel of a color filter array in accordance with the present invention;

FIG. 2 is a plan view of a particular embodiment of a kernel of a color filter array in accordance with the present invention;

FIGS. 3A and 3B are respectively cross-sectional views taken along the lines 3A—3A and 3B—3B of the area image sensor of FIG. 2;

FIG. 4 is a plan view of the embodiment shown in FIG. 2 with subscript numbers added to show rows and columns; and FIG. 5 is a plan view of another embodiment of a kernel of a color filter array in accordance with the present invention.

DESCRIPTION OF THE PREFERRED EMBODIMENTS

FIG. 1 is a plan view of a new four-color CFA kernel. The colors are chosen so that $V=(A+B)/2=(C+D)/2$, where V is luminance. The color pixels of each kernel which satisfy the above equation are arranged so that A and B are companion colors and C and D are companion colors as will be explained later. By use of the term "kernel" is meant a minimal repeating pattern of color pixels or elements of a CFA filter that is two-dimensionally replicated over the full extent of the color filter array. In a preferred embodiment set of colors is A=magenta (M), B=green (G), C=cyan (C) and D=yellow (Y). Expressing this set of colors in terms of red (R), green (G) and blue (B): Under these definitions, V=(R+2G+B)/4. This preferred embodiment is shown in FIG. 2 wherein the pattern has green, magenta, cyan, and yellow pixels.

M=(R+B)/2 G=G
C=(G+B)/2
Y=(R+G)/2

FIG. 3A is a cross-sectional view of an area image sensor 10 taken along the lines 3A—3A of FIG. 2. As shown, the image sensor 10 includes a silicon substrate 12 into which is doped pixel areas 14. In this particular embodiment, there are two dye-receiving layers 16 and 18 respectively formed on the silicon substrate 12. In this arrangement, the dye pattern shown in FIG. 2 is exemplified.

FIG. 3B is similar to FIG. 3A and includes the same elements except that it should be noted that a yellow portion is disposed directly over a cyan dye portion. These portions are aligned with a particular image sensor pixel. The combination of the yellow and cyan portions forms the green pixels shown in FIG. 2. Although the superimposed cyan and yellow colored portions are preferably the same cyan and yellow dyes shown in the dye-receiving layers 16, it will be understood by those skilled in the art that different cyan and yellow dyes can be used to form a green pixel. For an example of a color filter array which uses different color dyes, see commonly assigned U.S. Pat. No. 5,419,990 issued May 30, 1995 to Wake et al, the disclosure of which is incorporated herein.

Due to the arrangement of color filter array pattern shown in FIG. 2, V can be interpolated in either of two diagonal directions at each location of the CFA, which permits adaptive CFA interpolation of luminance values. In FIG. 4, the same color pixel kernel shown as in FIG. 2; however, in FIG. 4 each of the pixels carry a subscript number. The first number in the subscript corresponds to the row and the second subscript corresponds to the column. For clarity of illustration, FIG. 4 has been shows as a 5×5, although the kernel, of course, is still 2×2. Most notably, at each location in the pattern, V can be estimated in the positive slope diagonal and negative slope diagonal directions. The value $V_{33}$ can be calculated as below:

$$V_{33}=(-M_{15}+3G_{24}+8M_{33}+3G_{42}-M_{51})/12$$

$$V_{33}=(-M_{11}+3G_{22}+8M_{33}+3G_{44}-M_{55})/12$$

Two chrominance channels are also defined for this pattern: C1=K1 (D-C) and C2=K2 (A-B). The values K1 and K2 are scaling constants. In the preferred embodiment of FIG. 2, K1=½, K2=½ and, as before, A=M, B=G, C=C and D=Y. As a result, once a luminance value has been calculated for each pixel location, C1 or C2 can be calculated directly. Missing values of C1 and C2 can be adaptively interpolated because each location missing C1 or C2 is surrounded by four locations having defined values.

For example, in FIG. 4, once $V_{33}$ has been computed, the value for $(C2)_{33}$ now can be computed as $(M_{33}-V_{33})$. At the pixel of $M_{33}$, only the value of $(C1)_{33}$, which is derived from cyan and yellow, is missing. However, at the four adjacent pixels, the values $(C1)_{23}$, $(C1)_{32}$, $(C1)_{34}$, and $(C1)43$ are known.

Therefore, the value $(C1)_{33}$ may be adequately computed using one of the following equations:

$$(C1)_{33}=((C1)_{23}+(C1)_{43})/2$$

$$(C1)_{33}=((C1)_{32}+(C1)_{34})/2$$

Once there is a value of V, C1 and C2 at each pixel location, corresponding values of R, G and B can be obtained through a simple linear transform.

In accordance with the above discussion, A and B are defined to be companion colors in that the sum of the colors is proportional to luminance and the difference of the colors is proportional to chrominance. Likewise, C and D are also companion colors.

FIG. 5 shows an alternative embodiment of the present invention. It should be noted that the kernel pattern of FIG. 5 is similar to that shown in FIG. 2 with the exception that the cyan pixels are replaced by yellow pixels and the yellow pixels are replaced by cyan pixels. It should now be clear that these colors can be handled in a similar fashion using Equations 1.

The invention has been described in detail with particular reference to certain preferred embodiments thereof, but it will be understood that variations and modifications can be effected within the spirit and scope of the invention.

PARTS LIST 10 image sensor
12 silicon substrate
14 pixel areas
16 dye-receiving layers
18 dye-receiving layers

What is claimed is:

1. A color filter array for an image sensor which has a plurality of pixels, the color filter array comprising:

(a) a plurality of color pixel kernels, with each kernel having the plurality of pixels arranged in the following pattern

| A | C |
|---|---|
| D | B | wherein:
A and B are companion colors; and
C and D are companion colors.

2. A color filter array for an image sensor which has a plurality of pixels, the color filter array comprising:

(a) a plurality of color pixel kernels, with each kernel having the plurality of pixels arranged in the following pattern

| M | Y |
|---|---|
| C | G | wherein:
M is magenta;
G is green;
C is cyan; and
Y is yellow.

3. A color filter array for an image sensor which has a plurality of pixels, the color filter array comprising:

(a) a plurality of color pixel kernels, with each kernel having the plurality of pixels arranged in the following pattern

| | |
|---|---|
| M | C |
| Y | G | wherein:

M is magenta;

G is green;

C is cyan; and

Y is yellow.

\* \* \* \* \*